United States Patent [19]

Duvdevani et al.

[11] Patent Number: 4,656,204

[45] Date of Patent: Apr. 7, 1987

[54] PROCESS FOR USE OF DRAG REDUCTION AGENT IN A HYDROCARBON LIQUID

[75] Inventors: Ilan Duvdevani, Leonia; Robert D. Lundberg; Ralph M. Kowalik, both of Bridgewater; Dennis G. Peiffer, East Brunswick, all of N.J.

[73] Assignee: Exxon Research and Engineering Company, Florham Park, N.J.

[21] Appl. No.: 547,929

[22] Filed: Nov. 2, 1983

[51] Int. Cl.$^4$ .............................................. B05D 5/08
[52] U.S. Cl. .................................... 523/175; 524/516
[58] Field of Search .................... 523/175; 524/516; 528/480

[56] References Cited

PUBLICATIONS

Eisenberg et al., Polym. Eng. Sci., vol. 22, Dec. 1982, pp. 1117–1122.

Zohn et al., J. Polym. Sci., vol. 21, Apr. 1983, pp. 595–603.

*Primary Examiner*—Amelia Burgess Yarbrough
*Attorney, Agent, or Firm*—Richard E. Nanfeldt

[57] ABSTRACT

The present invention relates to an improved process for the use of drag reduction agents, which are polymer complexes of a cationic polymer and an anionic polymer.

16 Claims, No Drawings

PROCESS FOR USE OF DRAG REDUCTION AGENT IN A HYDROCARBON LIQUID

FIELD OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate. When flow in the pipe is turbulent (flow Reynolds number = mean fluid velocity × pipe diameter ÷ fluid kinematic viscosity greater than about 2000) the relationship between pressure drop and flow rate can be altered by the addition of small amounts of certain high molecular weight linear polymers to the liquid. These polymers interact with the turbulent flow processes and reduce frictional pressure losses such that the pressure drop for a given flow rate is less, or the flow rate for a given pressure drop is larger. This phenomenon is commonly called drag reduction. It has been used in commercial oil piplines, fire hoses and storm sewers to increase the flow capacities of existing systems. It can also be used to reduce supply pressures, pumping costs, and/or pipe diameters for given flow capacities.

BACKGROUND OF THE INVENTION

High molecular weight hydrocarbon soluble polymers such as polyisobutylene, polystyrene, and several poly α-olefins have been demonstrated to reduce drag in turbulent flows of hydrocarbon liquids. Generally, the drag reduction effectiveness of these polymers improves with increasing molecular weight; however, the tendency for the polymers to permanently degrade via molecular scission in local extensional flows within pumps or turbulent pipeflows also increases with increasing polymer molecular weight. This invention discloses efficient drag reduction in hydrocarbon liquids resulting from a novel class of interpolymer complexes which are prepared by a unique and novel process containing, for example, a styrene/vinyl pyridine (SVP) random copolymer and a randomly sulfonated ethylene propylene diene monomer (S-EPDM) copolymer. These complexes can provide improved drag reduction via enhanced molecular interactions rather than increased molecular weight and, consequently, may be less sensitive to flow degradation.

Drag reduction in turbulent flow can be achieved by the addition of minor amounts of a very high molecular weight polymer which is soluble in the fluid of interest. Copending application, entitled "Drag Reduction Agent for Hydrocarbon Liquid", Ser. No. 547,909, filed the same day as this application, describes drag reduction obtained by addition of a novel interpolymer complex derived from a combination of cationic and anionic polymers. In such interpolymer complexes, the polymers used may be of lower molecular weight, but the size of the complex rather than molecular weight controls drag reduction efficiency.

Normally, drag reduction is demonstrated by dissolving the high molecular weight polymer in the fluid prior to subjecting it to flow in which drag is reduced. In this invention, it is disclosed that when an interpolymer complex or other multi-ingredient additives are used for drag reduction, the preparation sequence of the solution, or the introduction method and sequence, can significantly affect drag reduction efficiency and that given schemes will be advantageous.

PRESENT INVENTION

The present invention discloses drag reduction agents for hydrocarbon liquids which are polymer complexes of a cationic and anionic polymer.

SUMMARY OF THE INVENTION

The present invention relates to unique and novel drag reduction agents for hydrocarbon liquids which are hydrocarbon solutions of water insoluble polymers, wherein the polymer complexes, which are the drag reduction agents, are formed in situ within the hydrocarbon liquid, within the conduit in which the hydrocarbon liquid is flowing. Hydrocarbon solutions of the cationic polymer and the anionic polymer are formed and these two solutions are injected through ports in the conduit into the hydrocarbon liquid within the conduit.

GENERAL DESCRIPTION

The present invention relates to unique and novel drag reduction agents for hydrocarbon liquids which are hydrocarbon solutions of water insoluble polymers, wherein the polymer complexes, which are the drag reduction agents, are formed in situ within the hydrocarbon liquid, within the conduit in which the hydrocarbon liquid is flowing. Hydrocarbon solutions of the cationic polymer and the anionic polymer are formed and these two solutions are injected through sequential ports in the conduit into the hydrocarbon liquid within the conduit.

A number of advantageous processes can be employed for the separate injection of the solution of the sulfonated polymer and styrene vinyl pyridine copolymer into the hydrocarbon liquid flowing within the conduit.

The first process comprises injecting a solution made of the sulfonated polymer in the hydrocarbon liquid flowing in the conduit through the first port. This solution should be a moderately concentrated solution, preferably over 1000 ppm of sulfonated polymer or well above the polymer overlap concentration which can be roughly calculated by $1/[\eta]$, wherein $[\eta]$ is the intrinsic viscosity for the polymer in the carrier fluid at the use temperature.

The solution of the styrene vinyl pyridine copolymer at a moderately high concentration (as described for the sulfonated polymer) should be injected via a second port at the same axial location in which the port for the sulfonated polymer is located or within a short distance from it.

The injection rates in relation to the flow rate in the main conduit will determine the total polymer concentration and interpolymer composition.

In this scheme, the interpolymer complex will be formed shortly after injection of both individual ingredients. If one of the polymers shows a polyelectrolyte effect, (such as may be the case for a vinyl pyridine containing polymer) this polymer can be injected first or dissolved in the fluid of interest prior to its introduction to the line.

This scheme is advantageous since it overcomes possible high viscosities which may result from the preparation of an interpolymer complex at higher concentrations. Also, using moderately high concentrations of the individual polymers and injecting them at close proximity will enable the instant establishment of intermolecular complexes. If both polymers are diluted before they can come into contact (such as by a large distance) there may be a low efficiency of obtaining molecular complexes. Dilution of an interpolymer complex solution prior to flow can also result in a low number of complexed molecules.

The maximum distance between ports is about 50 diameters, more preferably about 20 diameter, and most preferably about 5 diameters.

The second process comprises forming the solution of the polymer complex having a maximum viscosity of about 500 times that of the solvent, more preferably up to about 300 times solvent viscosity, and most preferably up to about 200 times solvent viscosity, and injecting it through a first port in the conduit into the hydrocarbon liquid flowing within the conduit. A make-up solution to adjust the interpolymer complex to its desired composition should be injected through a second port as in the first case, wherein a make-up solution is a solution of one of the polymers only or of the polymer complex as explained below.

This scheme is advantageous since it enables some intermolecular complexation to take place before injection into the line. Larger structures can result by contacting the cationic and anionic polymers at higher concentrations. At the optimal composition, however, viscosity may be too high to allow injection of the interpolymer complex; this composition can be obtained by an adjusting solution of either polymer A or polymer B injected at a point of close proximity to the point at which the interpolymer complex of lower viscosity is injected.

A third process for introducing drag reducing agent which comprises a moderately concentrated solution of either polymer or interpolymer complex and which is too viscous for injection, a solution with an additive or cosolvent that reduces the viscosity can be prepared and injected first. In a second port, as in the first process, a liquid that will extract the additive and will bring about the establishment of an interpolymer complex should be injected. For example, a concentrated solution of Sulfo-EPDM and styrene vinyl pyridine polymers in xylene at a few thousand ppm could be very viscous or a gel. On the other hand, addition of 1,000 to 50,000 ppm of alcohol, such as methanol, can reduce the viscosity greatly. Water injected in an adjacent port will remove the alcohol and cause the desired establishment of the interpolymer complex.

This scheme is again advantageous since the ingredients will still have a high concentration at the point contact is made with the extracting additive. This will enhance the possibility for forming a larger number of complexed polymer networks.

In a fourth process, there is a possibility of gaining an advantage by injecting an interpolymer complex solution to which a cosolvent was added for viscosity reduction without having to inject an extracting liquid as in the third process. In this case, a moderately concentrated solution of the complex will contain a minimum amount of cosolvent necessary for obtaining a sufficiently low viscosity. Injection will take place from a single port such that dilution under shear will effectively remove the cosolvent and allow the establishment of interpolymer complexing.

In all the schemes presented above, and particularly in the third and the fourth, the moderately concentrated solution can be prepared in a solvent other than the fluid for which drag is being reduced.

The polymer complexes of the instant invention, which are effective drag reduction agents for hydrocarbon liquids, comprise the reaction product of a cationic polymer such as a sulfonated polymer, and an anionic polymer such as styrene vinyl-pyridine.

The preferred ionic EPDM terpolymers for use in the instant invention have ethylene levels of 30–80 weight percent, 0.2–10 weight percent diene monomer such as ethylidene norbornene and the balance being propylene. Preferred sulfonation levels are 2–40 meq/100 g. Other specific examples of preferred ionomeric polymers which are useful in the instant invention include sulfonated polystyrene, sulfonated poly-t-butyl styrene, sulfonated polyethylene, (substantially non-crystalline) and sulfonated polyethylene copolymers, sulfonated polypropylene (substantially non-crystalline), and sulfonated polypropylene copolymers, sulfonated styrene-methyl methacrylate copolymers, (styrene)-acrylic acid copolymers, sulfonated polyisobutylene, sulfonated ethylene-propylene terpolymers, sulfonated polyisoprene, sulfonated polyvinyl toluene, sulfonated polyvinyl toluene copolymers and isoprene styrene sulfonate copolymers formed by a free radical copolymerization process.

We have found surprisingly that a very important factor in determing the strength of the interaction between the amine containing polymer and the sulfonate containing polymer is the nature of the counter ion. There are broadly speaking three major classes of such counter ions. The first class which are less preferred are those metals of Group I, and Group IIA, which include Li, Na, K, etc. Be, Mg, Ca, etc. We have found that these species do not interact as strongly with amine groups as the more preferred species described below. Those metals commonly defined as members of the transition elements (see Chemical Text: Chemical Principles and Properties by M. J. Sienko and R. A. Plane; McGraw Hill Book Co., 1974, page 19). These metal cations are best exemplified by zinc and interact strongly with pyridine and similar amines. As a consequence a zinc neutralized sulfonated polymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated polymer which will also interact with amine containing polymers. In this latter case it is clear that the interaction is a classic acid base interaction, while with the transition metals a true combination complex is created which is due to the donation of the election pair of the nitrogen element. This distinction is a very important one and sets these complexes apart from classic acid base interactions. The surprising observation is that such coordination complexes can form in such extreme dilution insofar as interacting groups are concerned, and that they are apparently formed so far removed from their expected stoichiometry, (based on small molecular analogs).

A variety of polymer backbones will display the desirable properties discovered in this invention:

| Sulfonate Polymer | Amine Polymer |
|---|---|
| Sulfo-EPDM | Styrene/Vinyl Pyridine |
| Sulfonate Isoprene Copolymers | Copolymer |

| Sulfonate Polymer | Amine Polymer |
|---|---|
| Sulfonate SBR Polymers | Vinyl Pyridine/Styrene/ |
| Sulfonate Butadiene Polymers | Butadiene Terpolymers |
| Sulfonated Butyl | Isoprene/Vinyl Pyridine |
| Sulfonated Acrylate and | Copolymer Ethylacrylate/ |
| Methacrylate Copolymers | Vinyl Pyridine Copolymer |
| Sulfonated Block Polymers | and Alkyl Acrylate |
| | Copolymers with Vinyl |
| | Pyridine where the Alkyl |
| | group varies in carbon |
| | number from 1 to 18 |
| | Methyl Methacrylate/ |
| | Vinyl Pyridine Copolymer |
| | and alkyl methacrylate |
| | copolymers with vinyl |
| | pyridine wherein the |
| | number of carbon groups |
| | in the alkyl group varies |
| | from 1 to 18 carbon atoms |
| | Butadiene/Vinyl Pyridine |
| | Copolymer Propylene/Vinyl |
| | Pyridine Block Copolymer |
| | Ethylene/Vinyl Pyridine |
| | Block Copolymer |
| | T-butyl styrene/vinyl |
| | pyridine copolymers |

The amount of vinyl pyridine in the amine containing polymer can vary widely, but should range from less than 50 weight percent down to at least 0.5 weight percent.

Preferably the amine content in the basic polymer is exposed in terms of basic nitrogen. In this respect the nitrogen content in amides and similar non basic nitrogen functionality is not part of the interacting species.

A minimum of three basic groups must be present, on the average per polymer molecule and the basic nitrogen content generally will range from 4 milliequivalents per 100 grams of polymer up to 500 meq. per 100 gms. A range of 8 to 200 meq/100 grams is preferred.

The ionomeric polymers of the instant invention may be prepared prior to incorporation into the organic solvent, or by neutralization of the acid form in situ.

For example, preferably the acid derivative is neutralized immediately after preparation. For example, if the sulfonation of the polymer is conducted in solution, then the neutralization of that acid derivative can be conducted immediately following the sulfonation procedure. The neutralized polymer may then be isolated by means well-known to thos skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability, and the above operations avoid that problem.

The cataionic polymer is typically a polymeric backbone containing basic groups which may be in the chain or pendant to it. It may be obtained by direct copolymerization of a monomer containing the basic moieties with another monomer or by grafting a monomer containing the basic moieties on to a prepolymerized chain. The typical reactions used in such synthesis are free radical reactions. The monomers used for forming the major part of such a polymer can be chosen from vinyl monomers which will lead to hydrocarbon soluble polymers such as: styrene, t-butyl styrene, acrylonitrile, isoprene, butadiene, acrylates, metacrylates and vinyl acetate. Monomers containing basic moieties will typically be monomers which contain amine alkyl amine groups or pyridine groups such as vinyl pyridine.

The styrene-vinyl pyridine copolymer of the polymer complex is formed by copolymerizing styrene and vinyl pyridine preferably via a free radical polymerization and preferably in an emulsion polymerization. The vinyl pyridine content of the co-polymer is about 0.5 to about 50.0 weight percent, more preferably about 0.5 to about 20 weight percent and most preferably about 1 to about 20 weight percent. The number average molecular weight is about 10,000 to about 10,000,000 more preferably about 20,000 to about 5,000,000 and most preferably about 30,000 to about 2,000,000.

The polymer complex of the sulfonated polymer and the styrene-vinyl pyridine copolymer are formed by forming a first solution of the sulfonate polymer in a hydrocarbon liquid and a second solution of the styrene-vinyl pyridine copolymer in the organic liquid, wherein the organic liquid which has a solubility parameter of less than 9.5 is selected from the group consisting of mineral oil, synthetic oil, alkanes, cycloalkanes, and aromatics and mixtures thereof. The concentration of the sulfonated polymer in the first solution is about 0.0005 to about 3.0 grams per 100 ml of organic liquid, more preferably about 0.001 to about 2.0, and most preferably about 0.005 to about 2.0. The concentration of the styrene-vinyl pyridine copolymer in the second solution is about 0.0005 to about 4.0 grams per 100 ml of the organic liquid, more preferably about 0.001 to about 3.0, and most preferably about 0.005 to about 2.0. The two solutions of the sulfonated polymer and the styrene-vinyl pyridine copolymer are mixed together to form the polymer complex, wherein either the sulfonated polymer or styrene-vinyl pyridine copolymer may be substantially in excess of the other. Further dilution may be accomplished by adding hydrocarbon solvent to the mixture of the two polymer solutions. The formation of the complex is schematically represented by:

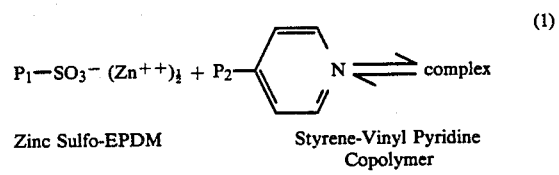

(1)

$P_1-SO_3^- (Zn^{++})_{\frac{1}{2}} + P_2-$⟨pyridine⟩ ⇌ complex

Zinc Sulfo-EPDM      Styrene-Vinyl Pyridine Copolymer

The concentration of the polymer complex in the hydrocarbon liquid as an effective drag reduction agent is about 0.001 to about 1.0 grams per 100 ml, more preferably about 0.003 to about 0.5, and most preferably about 0.006 to about 0.1. Suitable hydrocarbon liquids in which the aforementioned polymer complexes are effective drag reduction agents are selected from the group consisting of alkanes, cycloalkanes, mineral oils, synthetic oils and aromatics and mixtures thereof.

DESCRIPTION OF THE PREFERRED EMBODIMENTS

The following examples illustrate the present invention without, however, limiting the same hereto.

EXAMPLE 1

Synthesis

A representative example for the synthesis of styrene-4-vinylpyridine copolymer (SVP) is outlined below.

Into a 1-liter 4-neck flask the following ingredients were introduced:
100 g distilled styrene
6.4 g sodium lauryl sulfate
240 ml. distilled water
0.4 g potassium persulfate
9.4 g 4-vinylpyridine The solution was purged with nitrogen gas for 10 minutes to remove dissolved oxygen. As the nitrogen gas purge began, the solution was heated to 55° C. After 24 hours, the polymer was precipitated from solution with methanol. Subsequently, the resulting polymer was washed several times with a large excess of methanol and dried in a vacuum oven at 60° C. for 24 hours. Elemental analysis showed a nitrogen content of 1.13 weight percent which corresponds to 8.4 mole percent 4-vinylpyridine.

EXAMPLE 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated MS-14. The resulting polymer was available as a free-flowing crumb and employed in that form as a blending component in the following examples.

EXAMPLE 3

In practice it may be more convenient to introduce a drag reducing agent into a fluid flowing in a pipeline by injecting a concentrated solution of the drag reducing agent through a side port in the main conduit. The flow rate of the concentrated solution is adjusted to yield the desired concentration of the agent in the pipeline fluid.

For interpolymer complexes such as that of zinc-sulfo-EPDM and styrene-vinyl pyridine copolymer, a concentrated solution may be very viscous. However, concentrated solutions of the individual polymers may be much lower in viscosity and hence easier to inject, as explained for the first process of this invention.

A drag reduction agent can be prepared from an interpolymer complex of zinc-sulfo-EPDM polymer (MS-14) and a styrene vinyl pyridine copolymer (7742-154-2). MS-14 is a zinc-sulfo-EPDM at 10 meq. per 100 grams of sulfonation level on a 90,000 weight average molecular weight EPDM backbone. The backbone is composed of 55 weight percent ethylene, 40 weight precent propylene and 5 weight percent ethylidene-norbornene. It was made following the procedure of Example 2.

The styrene-vinyl pyridine copolymer, 7742-154-2, is a copolymer containing about 8 mole percent of vinyl pyridine and having a weight average molecular weight of about 2,000,000.

An effective drag reducing agent can be formed by combining the two polymers described above at a molar ratio of pyridine to sulfonate groups of about 3.6 to 1 respectively. Such an interpolymer complex at a concentration of 1 weight percent in xylene is virtually a non flowable gel. At 5000 ppm concentration of the complex in xylene the viscosity is in excess of 1000 cP at low shear rates (below 60 sec$^{-1}$). However the individual viscosities at 5000 ppm for MS-14 and 7742-154-2 in xylene are 1.2 and 2.7 cP respectively. It is therefore advantageous to inject the individual polymer solutions and form the desired complex in situ. This will correspond to the first process of this invention as described above.

Since many modifications and variations of this invention may be made without departing from the spirit or scope of the invention thereof, it is not intended to limit the spirit or scope thereof to the specific examples thereof.

What is claimed is:

1. A process for preparing a drag reduction agent for a hydrocarbon liquid flowing through a conduit which comprises the steps of:
   (a) forming a first solution of a sulfonated polymer in a first hydrocarbon solvent;
   (b) forming a second solution of a styrene vinyl pyridine copolymer in a second hydrocarbon solvent;
   (c) injecting said first solution of said sulfonated polymer through a port in said conduit; and
   (d) injecting said second solution of said styrene vinyl copolymer through a second port in said conduit into said mixture of said sulfonated polymer and said hydrocarbon liquid flowing in said conduit to form a polymer complex of said sulfonated polymer and said styrene vinyl pyridine within said hydrocarbon liquid.

2. A process according to claim 1, wherein said first solution of said sulfonated polymer is mixed with such hydrocarbon liquid prior to introduction of said hydrocarbon liquid in said conduit.

3. A process according to claim 1, wherein said first solution of said sulfonated polymer is injected through a second port in said conduit into said hydrocarbon liquid within said conduit and wherein second solution of said styrene vinyl pyridine is injected through a first port in said conduit.

4. A process according to claim 1, 2, or 3, wherein said first and said second hydrocarbon solvents are selected from the group consisting of alkanes, cycloalkanes, aromatics, and mixtures thereof.

5. A process according to claim 1, 2 or 3, wherein said hydrocarbon liquid is selected from the group consisting of alkanes, cycloalkanes, mineral oils, synthetic oils, and mixtures thereof.

6. A process according to claim 1, 2, or 3 wherein said sulfonated polymer has about 0.1 to about 10 mole percent pendant sulfonate groups.

7. The process according to claim 1, 2, or 3, wherein said sulfonated polymer is an ethylene propylene diene monomer terpolymer.

8. The process according to claim 1, 2 or 3, wherein said sulfonated polymer is selected from the group consisting of sulfonated ethylene, sulfonated propylene, sulfonated ethylenepropylene copolymers and terpolymers wherein the third monomer is a nonconjugated diene hydrocarbon having from 5 to 15 carbon atoms and sulfonated polystyrene.

9. A process for preparing a drag reduction agent for a hydrocarbon liquid flowing through a conduit which comprises the steps of:
   (a) forming a first solution of a sulfonated polymer in a first hydrocarbon solvent;
   (b) forming a second solution of a styrene vinyl pyridine copolymer in a second hydrocarbon solvent;
   (c) mixing said first solution with said second solution;

(d) mixing a cosolvent having a solubility parameter of at least about 10 with said mixture of said first and said second solutions; and (e) injecting said mixture of said first and said second solution and said cosolvent through a first port in said conduit into said hydrocarbon fluid flowing in said conduit to form a polymer complex of said sulfonated polymer and said vinyl pyridine copolymer within said hydrocarbon liquid.

10. A process according to claim 9, further including injecting an extracting liquid for said cosolvent through a second port in said conduit into said hydrocarbon liquid with said polymer complex and said cosolvent flowing in said conduit.

11. A process according to claim 9 wherein said first and said second hydrocarbon solvents are selected from the group consisting of alkanes, cycloalkanes, aromatics, and mixtures thereof.

12. A process according to claim 9 or 10, wherein said hydrocarbon liquid is selected from the group consisting of alkanes, cycloalkanes, mineral oils, synthetic oils, and mixtures thereof.

13. A process according to claim 9 or 10, wherein said sulfonated polymer has about 0.1 to about 10 mole percent pendant sulfonate groups.

14. The process according to claim 9 or 10, wherein said sulfonated polymer is an ethylene propylene diene monomer terpolymer.

15. A process according to claim 9 or 10, wherein said cosolvent is selected from the group consisting of alcohols, amines, esters, acids, and other polar compounds.

16. A process according to claim 9 or 10, wherein said extracting liquid is water.

* * * * *